United States Patent [19]

Kashihara

[11] Patent Number: 5,135,066
[45] Date of Patent: Aug. 4, 1992

[54] APPARATUS FOR DETECTING THE STEERING ANGLE OF REAR WHEELS OF A VEHICLE

[75] Inventor: Masanobu Kashihara, Hyogo, Japan

[73] Assignee: Mitsubishi Denki K.K., Tokyo, Japan

[21] Appl. No.: 759,196

[22] Filed: Sep. 11, 1991

Related U.S. Application Data

[63] Continuation of Ser. No. 532,547, Jun. 4, 1990, abandoned.

[30] Foreign Application Priority Data

Jun. 2, 1989 [JP] Japan .................................. 1-141813

[51] Int. Cl.⁵ .............................................. B62D 5/04
[52] U.S. Cl. ...................................... 180/79.1; 280/91
[58] Field of Search ...................... 180/79.1, 140, 141, 180/142; 280/91

[56] References Cited

U.S. PATENT DOCUMENTS

| 4,779,693 | 10/1988 | Takahashi et al. ................... 180/140 |
| 4,876,527 | 10/1989 | Oka et al. .......................... 180/197 X |
| 4,953,650 | 9/1990 | Ohmura ........................... 180/140 X |

FOREIGN PATENT DOCUMENTS

| 0243180 | 10/1987 | European Pat. Off. ............ 180/140 |
| 2613680 | 10/1988 | France . |
| 01240377 | 9/1989 | Japan . |
| 8910865 | 11/1989 | World Int. Prop. O. . |

Primary Examiner—Charles A. Marmor
Assistant Examiner—Kevin Hurley
Attorney, Agent, or Firm—Sughrue, Mion, Zinn, Macpeak & Seas

[57] ABSTRACT

An apparatus for detecting the steering angle of rear wheels of a vehicle, wherein a motor is used for steering the rear wheels and the motor is controlled by the number of pulses generated by a pulse generator which detects the revolutions of the motor and the output signal from an absolute encoder which detects the steering angle of the rear wheels.

1 Claim, 3 Drawing Sheets

(a)

(b)

(c)

APPARATUS FOR DETECTING THE STEERING ANGLE OF REAR WHEELS OF A VEHICLE

This is a continuation of application Ser. No. 07/532,547 filed Jun. 4, 1990, now abandoned.

BACKGROUND OF THE INVENTION

1. Field of the Invention

This invention relates to an apparatus for detecting the steering angle of the rear wheels of a vehicle.

2. Description of the Prior Art

A conventional apparatus for detecting the steering angle of the rear wheels of a vehicle is diagrammatically shown in FIG. 1, which apparatus comprises a signal 1 for representing a desired position of rear wheels 12, the signal 1 being supplied to a first summing point 2, an amplifier 3 for outputting an amplified signal to a second summing point 4, a motor 5 operable for performing the steering operation of the rear wheels, a pulse generator 6 for detecting the number of revolutions of the motor 5, an F-V converter 7 for converting the frequency of the pulses detected by the pulse generator 6 to an analog voltage signal which is, in turn, outputted to the second summing point 4 and then amplified by an amplifier 8, a worm gear unit 9 driven by the motor 5, a rack and pinion unit 10 interlocked with the worm gear unit 9 to perform the steering operation of the rear wheels through tie rods 11, a variable resistor 13 interlocked with the worm gear unit 9 and the resistance value of the resistor being outputted to the first summing point 2.

The conventional apparatus arranged as described above is operated as follows. The signal of the desired rear wheel position 1 and the signal from the variable resistor 13 are added at the first summing point 2 and the resultant signal is amplified by the amplifier 3 and outputted to the second summing point 4. On the other hand, the number of revolutions of the motor 5 is detected by the pulse generator 6 and negatively fed back through the F-V converter 7 to the second summing point 4. The resultant output of the second summing point is amplified by the amplifier 8 to drive the motor 5. Thus, the torque of the motor 5 is transmitted through the worm gear unit 9 to the rack and pinion unit 10 which converts the rotational motion to a rectilinear motion to allow the tie rods 11 to perform the steering operation of the rear wheels 12. The steering angle of the rear wheels 12 is detected by the variable resistor 13 through the worm gear unit 9, and the output signal of the resistor is supplied to the first summing point.

As described above, the detection of the steering angle of the rear wheels 12 is carried out by the variable resistor 13 operated by the worm gear unit 9 resulting in the drawback that a deterioration in linearity due to the degradation of the variable resistor 13 may not be detected.

SUMMARY OF THE INVENTION

Accordingly, it is a primary object of the invention to overcome the above-described drawbacks of the prior art and to provide an apparatus for detecting the steering angle of the rear wheels of a vehicle with a fail-safe control of the rear wheel steering operation.

According to the present invention, there is provided an apparatus for detecting the steering angle of the rear wheels of a vehicle comprising a motor operable for performing the steering operation of the rear wheels, a pulse generator for detecting the number of revolutions of the motor, an absolute encoder for detecting the steering angle of the rear wheels and a negative feedback circuit for receiving pulses from the pulse generator and a signal from the absolute encoder, whereby the number of pulses generated by the pulse generator and the interval of change in the signal of the absolute encoder are mutually observed through the negative feedback circuit to allow the mutual detection of a fault caused either in the pulse generator or the absolute encoder.

With such an arrangement, the pulses generated by the pulse generator and the output signal from the absolute encoder are utilized to recognize that the output signal of the absolute encoder is changed when a predetermined number of pulses is produced by the pulse generator and that conversely the number of pulses generated by the pulse generator between the transitions of output signal of the absolute encoder is a predetermined value, whereby a fault in either the absolute encoder or the pulse generator can be detected.

BRIEF DESCRIPTION OF THE DRAWINGS

For a better understanding of the invention, reference is made to the accompanying drawings, in which.

DETAILED DESCRIPTION OF THE PREFERRED EMBODIMENTS

A preferred embodiment of the present invention will now be described in connection with the drawings.

Figure 1:
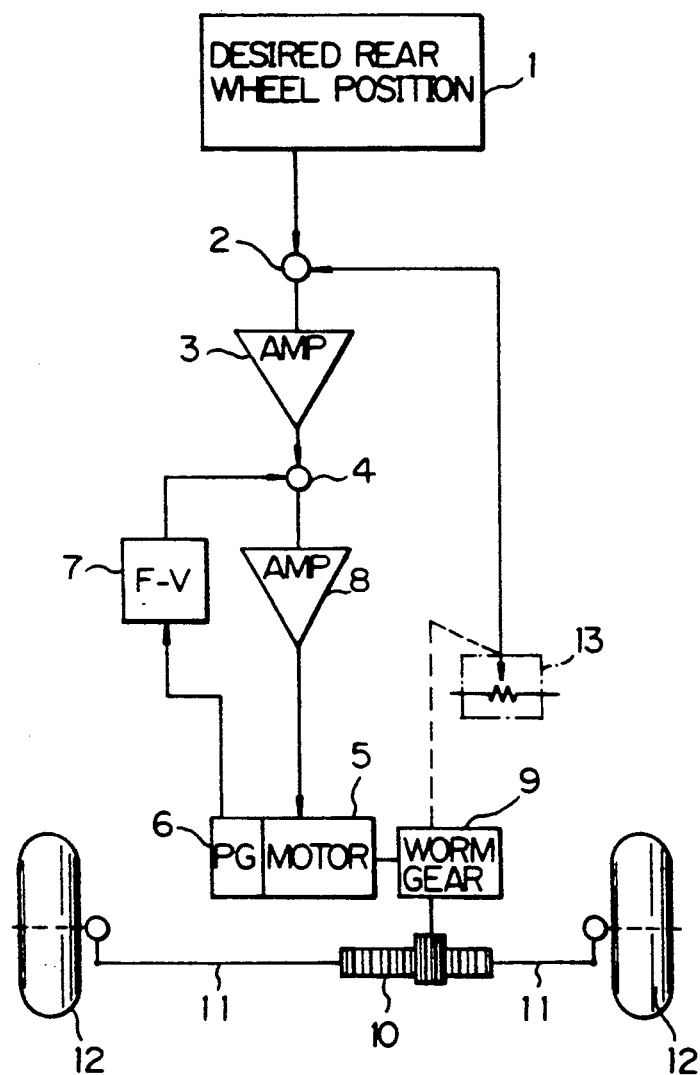
FIG. 1 is a diagrammatic representation of a conventional apparatus for detecting the steering angle of the rear wheels of a vehicle.
Figure 2:
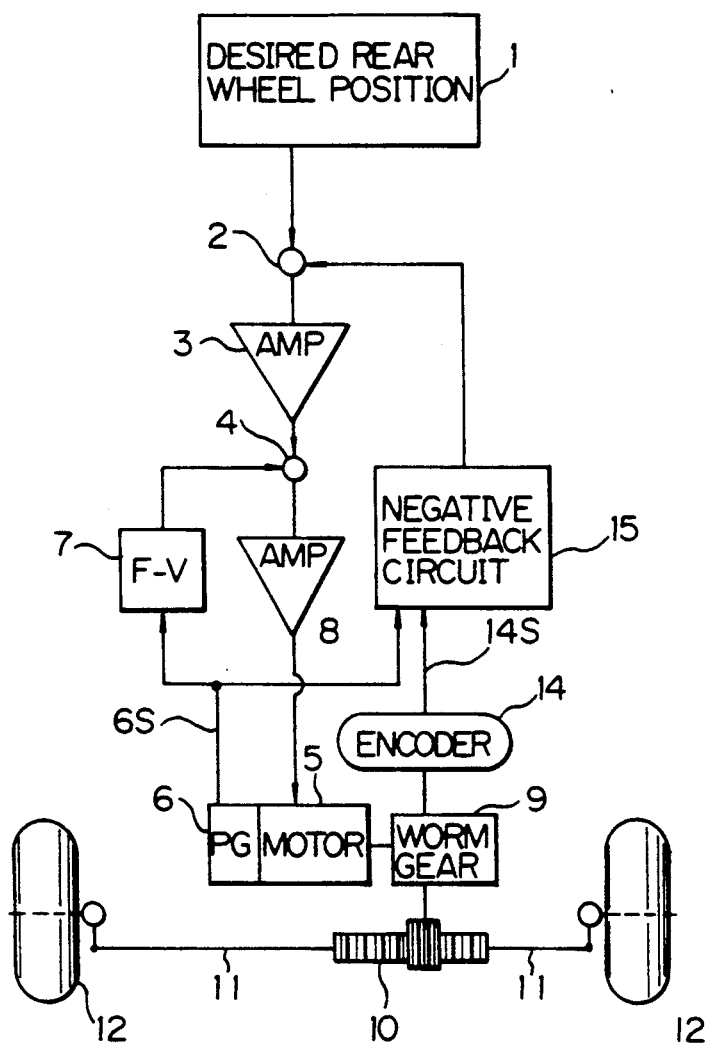
FIG. 2 is a diagrammatic representation of an embodiment of an apparatus for detecting the steering angle of the rear wheels of a vehicle in accordance with the present invention.

Referring to FIG. 2, there is shown an apparatus for detecting the steering angle of the gear wheels of a vehicle according to the present invention, in which parts the portions designated by the numerals 1 to 12 are similar to those of the prior art apparatus designated by the same numerals and are not further explained herein.

Figure 3:
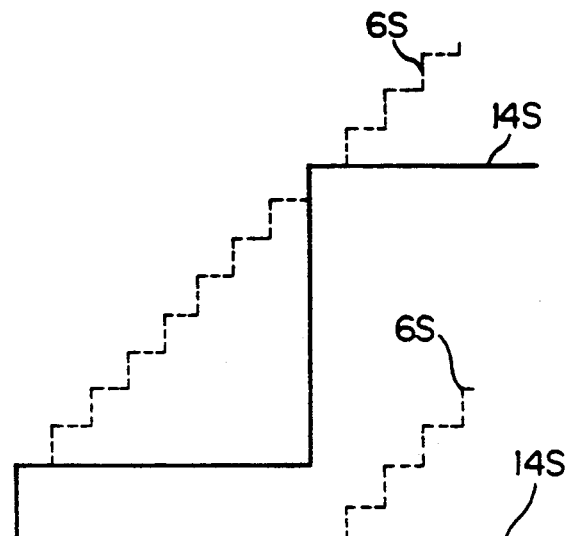
FIGS. 3($a$)–($c$) are diagrams illustrating the interrelationship between the output signals of the pulse generator and absolute encoder.
Figure 3:
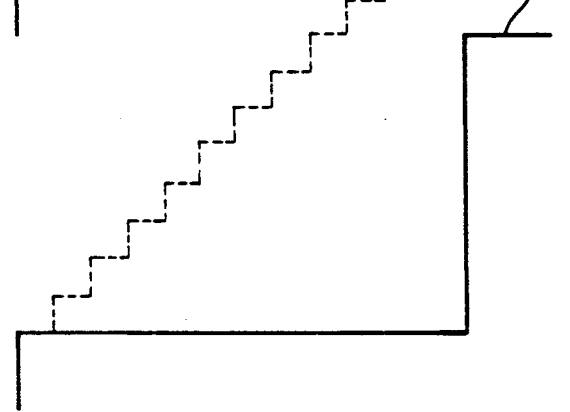
Figure 3:
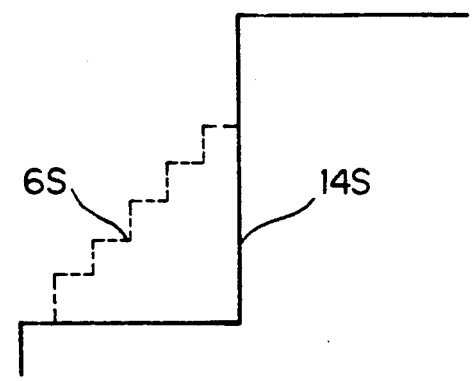

As shown, the apparatus includes an absolute encoder 14 connected to a worm gear unit 9 for detecting the steering angle of rear wheels 12, a negative feedback circuit 15 for receiving an output signal 14S from the absolute encoder 14 and pulse 6S from a pulse generator 6, the negative feedback circuit 15 serving to interpolate the intervals of change of the signal 14S of the absolute encoder with the pulses 6S of the pulse generator 6, as shown in FIG. 3($a$), and the interpolated value being negatively fed back to the first summing point 2.

The operation of the apparatus will next be described. A signal of the desired rear wheel position 1 and the signal of the negative feedback circuit 15 are added at a first summing point 2 and the resulting output is amplified by an amplified 3 and fed to a second summing point 4. On the other hand, the number of revolutions of a motor 5 is detected by the pulse generator 6 and negatively fed back through an F-V converter 7 to the second summing point 4 the output of which is then amplified by an amplifier 8 to drive the motor 5. Thus, the torque of the motor 5 is transmitted through the worm gear unit 9 to a rack and pinion unit 10 which, in turn, cause tie rods 11 to be operated to perform the steering operation of rear wheels 12. The steering angle of the rear wheels 12 is detected by the absolute encoder 14 and the output signal 14S of the encoder 14 is fed to the negative feedback circuit 15 for supplying the signal to the first summing point 2 so that an automatic control loop is formed.

With such an arrangement, the output signal 14S of the absolute encoder 14 is interpolated by the negative feedback circuit 15 with the output pulses 6S of the pulse generator 6 to allow the detection of the rear wheel steering position with a high resolution, and the number of pulses generated by the pulse generator 6 between the transitions of the signal of the absolute encoder 14 is constant so that the number of pulses generated by the pulse generator and the point of change in the signal of the absolute encoder 14 can be mutually observed to inspect either an abnormal increase or decrease in the number of pulses, as shown in FIGS. 3(b) and (c), respectively, thereby determining that there is an abnormality either in the pulse generator 6 or the absolute encoder 14. Thus, if the number of output pulses 6S of the pulse generator 6 is less than a predetermined number when the output signal 14S of the absolute encoder 14 changes, or if the output signal 14S of the absolute encoder 14 does not change even when a predetermined number of output pulses 6S has been generated by the pulse generator 6, it is determined that either the pulse generator 6 or the absolute encoder 14 is out of order and a warning signal (not shown) is generated, whereby the fail-safe function of the rear wheel steering control can be effected.

As described above, according to the present invention, the number of pulses of the pulse generator and the interval of change in the signal of the absolute encoder are mutually observed by the negative feedback circuit to allow the mutual detection of a fault caused in the pulse generator and absolute encoder, whereby the fail-safe function of the rear wheel steering angle control can be obtained.

Having described a preferred embodiment of the invention, it will be apparent to those skilled in the art that various alterations and modifications can be made within the scope of the invention.

What is claimed is:

1. An apparatus for detecting a steering angle of rear wheels of a vehicle comprising:
   a rotary motor operable for performing a steering operation of the rear wheels;
   a pulse generator for detecting a number of revolutions of the rotary motor,
   an absolute encoder for detecting the steering angle of the rear wheels,
   a negative feedback circuit for receiving pulses from said pulse generator and a signal from said absolute encoder, and
   fault locating means for locating a fault in either said pulse generator or said absolute encoder based on said pulses from said pulse generator and said signal from said absolute encoder, whereby an interval of change of said signal from said absolute encoder is interpolated by pulses from said pulse generator, and the number of pulses generated by said pulse generator and said interval of change in the signal of said absolute encoder are mutually observed through the negative feedback circuit for detection of said fault caused either in said pulse generator or said absolute encoder.

* * * * *